April 30, 1929.   W. T. WATSON   1,710,849
HAND OPERATED BRAKE
Filed June 6, 1927
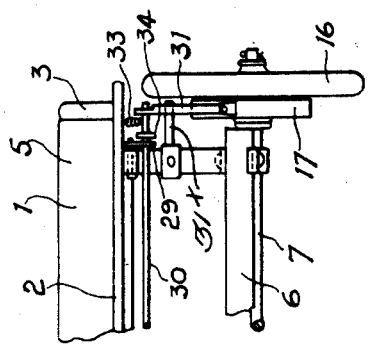
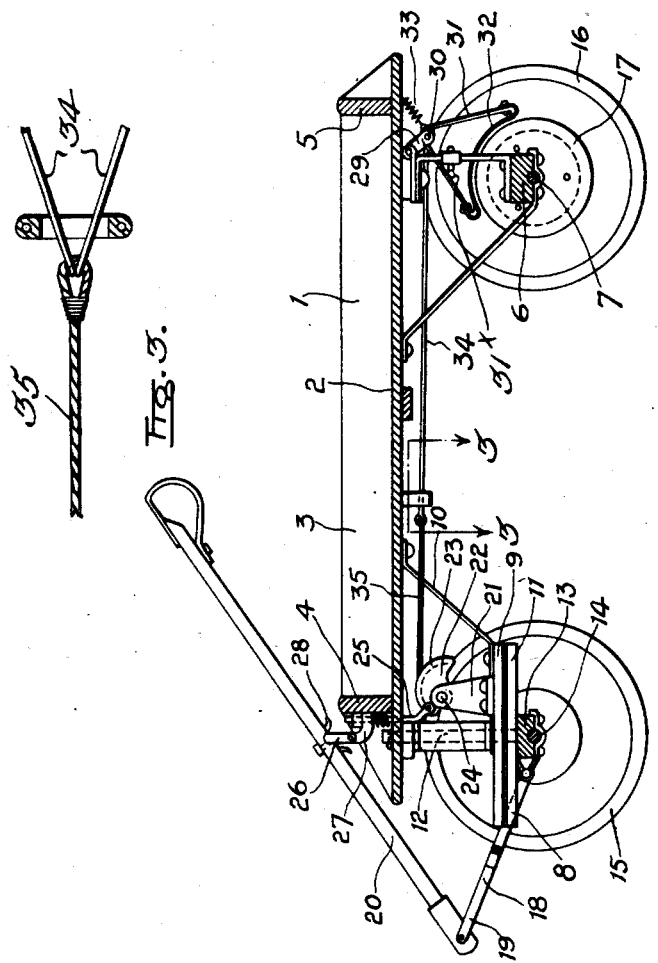
INVENTOR
WILLIAM THOMAS WATSON
BY Fetherstonhaugh & Co
ATTORNEYS Patented Apr. 30, 1929.

1,710,849

UNITED STATES PATENT OFFICE.

WILLIAM THOMAS WATSON, OF VANCOUVER, BRITISH COLUMBIA, CANADA.

HAND-OPERATED BRAKE.

Application filed June 6, 1927. Serial No. 196,932.

My invention relates to improvements in hand operated brakes which are particularly adapted for use on children's hand drawn wagons, and having for its objects the provision of means whereby the wagon tongue when used as a steering lever for the wagon, as in coasting, will on being depressed, apply a braking effect to the rear wheels; to provide a flexible braking medium to a brake drum which will automatically adjust itself to any irregularities in the periphery of said drum, and to provide means for withdrawing the brake from any contact with said drum on the elevating of the tongue. With these and other objects in view, I will now proceed to describe my invention in the following specification, having reference to the accompanying drawings, in which:—

Fig. 1 is a longitudinal section of the invention.

Fig. 2 is a fractional rear view showing the suspension of the brake beam.

Figure 3 is a fragmentary sectional view taken along the line 3—3 of Figure 1.
In the drawings like characters of reference indicate corresponding parts in each figure.

The numeral 1 indicates generally a wagon box having a floor 2, side walls 3, a front end wall 4 and a rear end wall 5. The box 1 is supported at its rear end upon a suitably mounted bolster 6 to which a rear axle 7 is attached, and upon a turntable 8 at its forward end. The turntable is preferably formed with an upper disc 9 which is held against movement by a brace 10 connecting it to the box 1, and a lower disc 11 which is rotatably connected to the upper disc 9 by a king bolt 12. Secured to the underside of the lower disc 11 is a bolster 13 to which the front axle 14 is attached. Front wheels 15 are mounted upon the axle 14 and rear wheels 16 having brake drums 17 on their inner sides are mounted on the rear axle 7. Hingingly secured to the front bolster 13 is a yoke 18 having a forked forward end 19 in which a tongue 20 is hingingly connected. To the rear of the king bolt 12 and preferably upon the upper disc 9 of the turntable 8 an upstanding bracket 21 is fitted in the upper end of which a cam 22 having a grooved peripheral edge 23 is journalled. The cam is so formed that its rear extremity is at a greater distance from its fulcrum pin 24 than its forward end, so as to produce a greater distance of peripheral travel to a given rotation as the cam is rocked in an anti-clockwise direction. Connected with the cam adjacent the king bolt is a spring supported push rod 25 which is suitably carried from the front board 4 of the wagon box 1, and is provided at its upper end with an upstanding crotch 26 which is forwardly cranked as at 27 so that the crotch is disposed axially above the king bolt 12 and forms a suitable fulcrum for the tongue 20 when swung back over the wagon box 1, in which position it is invariably disposed when used for coasting. In order that the tongue may be prevented from endwise movement when coasting, I attach to its upper side a cleat 28 which engages the crotch 26 when the tongue 20 is swung into its rearward or coasting position as shown in Figure 1.

Secured to the underside of the wagon floor 2 is a pair of cranks 29 which carry at their outer ends a shaft forming a brake beam 30 which in turn carries at each end a yoke 31 slidably movable upon a guide 31$^x$. This yoke is preferably formed of wrought iron so as to provide a degree of resilience thereto. To the outer ends of each yoke a resilient and arcuate brake shoe 32 is secured, preferably having a suitable lining, which shoes are adapted to engage the brake drums 17. A spring 33 is attached to the apex of each brake yoke 31 for the purpose of withdrawing the brake shoe from contact with the drums. Extending from the brake beam 30 is a pair of rods 34 which are connected together at their forward end and attached to a cable 35 which leads onto the cam 22, the forward end of said cable being suitably connected within the groove 23 adjacent the forward end of the cam face.

Having thus described the several parts of my invention I will now briefly explain its function.

When the person using the wagon is desirous of coasting, he swings the tongue 20 into a rearward position as shown with its cleat 28 in engagement with the crotch 26, thus disposing the tongue in a tiller position for steering the wagon. On applying a downward pressure to the free end of the tongue, a corresponding downward movement is imparted through the crotch 26 to the spring push rod 25, which in turn imparts an anticlockwise movement to the cam 22 and a pulling strain to the cable 35 and the rods 34, thus moving the yokes 31 towards the rear axle 7 and applying the brake shoes 32 to the brake drums 17. Owing to the periphery of the cam being at a greater distance from its pin at its rear end than at its face end, the application of the brakes will be effected at an increasing speed over the speed of depression of the push rod 25. As increasing pressure is applied to the brakes, the bands which are normally curved to a greater radius than the drums 17, will gradually decrease their radii to conform, thus bringing a greater brake area into action, such decreasing radius obviously causing the outer ends of the yokes 31 to be drawn closer together. When the downward pressure is removed from the free end of the tongue, the spring of the push rod 25 and the springs 33 restore the brakes and their associated parts to normal or off position.

What I claim as my invention is:

1. The combination of a wagon body equipped at the front end with a turn table revolvable about a vertical axis, a front axle secured to said turn table to turn therewith, front wheels carried by said axle, a rear axle suspended from the rear end of the body and equipped with rear wheels, a tongue connected to the mounting of the front wheels by a hinge permitting said tongue to swing forwardly to serve as a draught tongue or to swing rearwardly to serve as a steering tongue, a vertically movable member carried by the forward portion of the wagon body and provided at its upper extremity with a forwardly offset vertically extending saddle disposed in a vertical plane coinciding with the axis of rotation of said turn table, said saddle being adapted to receive and fulcrum said tongue when the latter is swung rearwardly to steering position, means for yieldingly maintaining said member and saddle in elevated position, and a brake mechanism connected to said member and arranged to be actuted thereby when the saddle is depressed in response to downward pressure exerted on said tongue.

2. A wagon equipped with front and rear wheels, the front wheels being turnably mounted for steering purposes, a tongue connected to the mounting of the front wheels by a hinge connection permitting said tongue to swing forwardly to serve as a draught tongue or to swing rearwardly to serve as a steering tongue, a brake mechanism including a normally elevated depressible saddle arranged to receive said tongue when the latter is swung rearwardly to steering position, said tongue being movable laterally in said saddle for steering purposes and being also capable of downward movement to depress the saddle and effect application of the brake mechanism.

Dated at Vancouver, B. C., this 27th day of May, 1927.

WILLIAM THOMAS WATSON.